Figure 1:
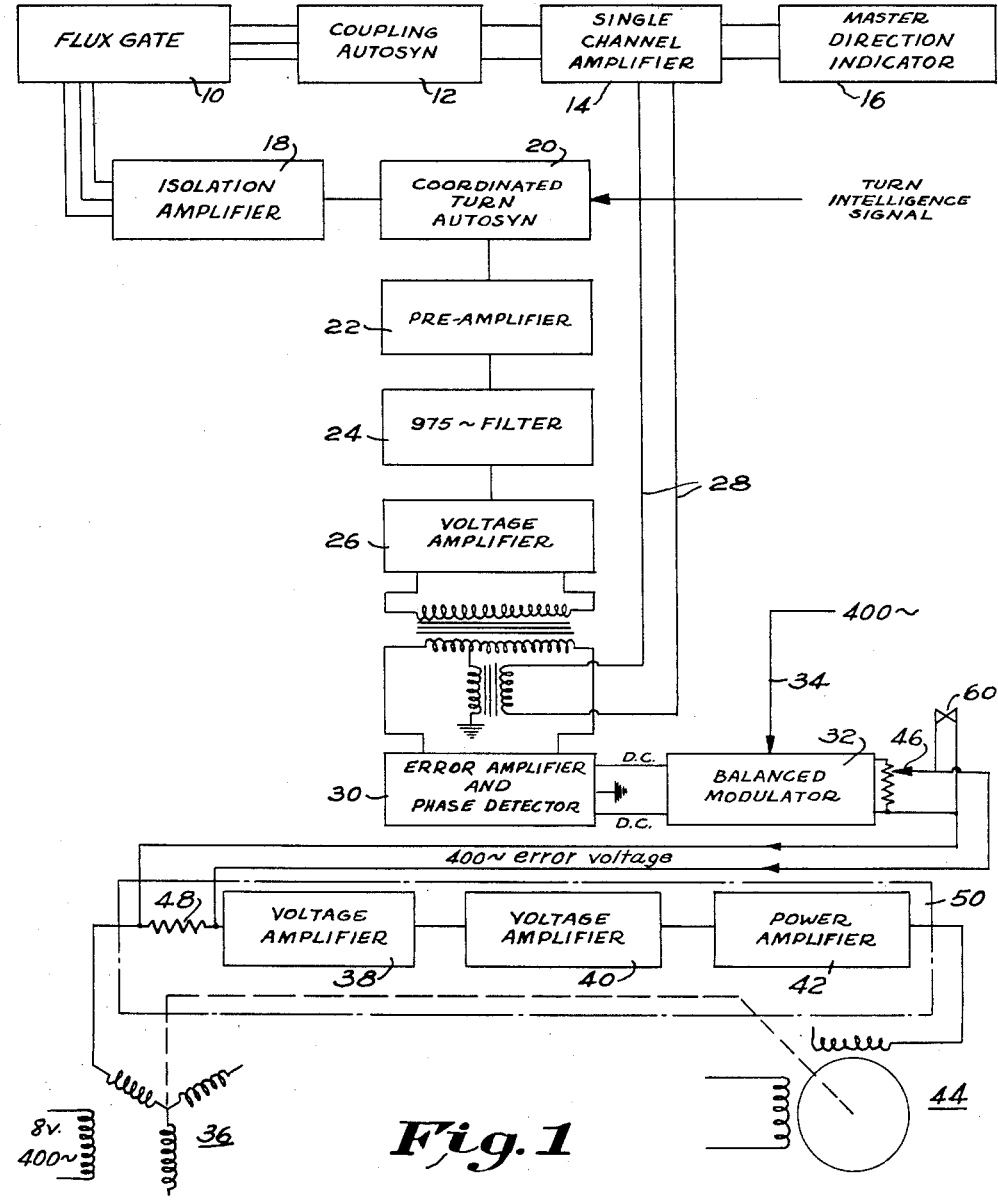

Inventor
Gordon S. Hartloff

Inventor
Gordon S. Hartloff
By
Bean, Brooks, Buckley & Bean
ATTORNEYS

July 26, 1960  G. S. HARTLOFF  2,946,944
AIRCRAFT FLIGHT CONTROL
Filed March 19, 1949  4 Sheets-Sheet 3

Inventor
Gordon S. Hartloff
By
Bean, Brooks, Buckley & Bean
ATTORNEYS

July 26, 1960   G. S. HARTLOFF   2,946,944
AIRCRAFT FLIGHT CONTROL
Filed March 19, 1949   4 Sheets-Sheet 4

Inventor
Gordon S. Hartloff
By
Bean, Brooke, Buckley & Bean.
ATTORNEYS

United States Patent Office

2,946,944
Patented July 26, 1960

2,946,944
AIRCRAFT FLIGHT CONTROL

Gordon S. Hartloff, Hamburg, N.Y., assignor to Bell Aircraft Corporation, Wheatfield, N.Y.

Filed Mar. 19, 1949, Ser. No. 82,353

1 Claim. (Cl. 318—489)

This invention relates to aircraft, and particularly to improvements in the automatic control of such craft.

In accordance with the prior art, the automatic control of rudder, elevator and aileron mechanisms to maintain a given course and attitude of aircraft in flight has been achieved by mechanism known generically as the automatic pilot, such mechanism generally comprising servo motors connected to each of the above mentioned controls and driven through suitable amplifiers from sensing devices which are under the control of gyroscopes or equivalent instruments sensitive to the orientation of the craft with respect to relatively fixed positional axes. The success of such automatic pilot mechanisms in maintaining a desired attitude of an aircraft in flight is well known. At the same time, such devices do not enable the operator or pilot to initiate a desired change in azimuth of a predetermined angular amount, such a maneuver requiring the usual estimating and judgment by the pilot in the coordination of speed of the craft, rate of turn, duration of turn, and other factors which may affect the accuracy with which the new course is established. It is, therefore, very desirable to provide an arrangement for the automatic accomplishment of a change in azimuth of any desired amount, the only intelligence required to be supplied by the pilot being an indication of the desired angular difference between the initial and final courses.

While the above considerations have been stated with respect to an aircraft which is under the immediate control of a human operator, they apply equally well to the case of a guided aircraft or missile whose normal flight is under the control of mechanism such as an automatic pilot, but in which it is desired to be able to initiate changes in course of predetermined amounts by controls operated in response to remote impulses; for example, by radio control either from ground stations or from other craft.

It is accordingly a principal object of the present invention to provide an automatic azimuth turn control whereby changes of flight course of any amplitude may be accomplished automatically in a coordinated fashion upon the introduction of a single intelligence signal having voltage, current or phase-displacement proportional to the angular difference between the initial and the desired course.

A further object of the invention is to provide such arrangements which are operable in conjunction with existing automatic controls and existing directionally sensitive devices, whereby the improvements may readily be incorporated in existing craft, or added to the known types of automatic pilots, with a minimum of complication.

Still another object of the invention is to provide an improved system of the above type in which the accuracy of accomplishment of the desired change in heading or course is at least equal to the inherent accuracy of available directionally sensitive devices, and in which the stability is sufficient to insure that the aircraft terminate its change in heading without over-shooting or hunting.

Still another object of the invention is to provide arrangements of the kind indicated above which may readily be placed under the control of known radio compasses or automatic direction finder systems, whereby automatic homing of the craft may readily be accomplished, or wherein the input intelligence signal may be received from a known type of radio beacon such as a low frequency quadrantal range, a VHF omni-range, or even an instrument landing system comprising glide-path and localizer beams.

In general, the above objects are accomplished by the provision of an electronic device which senses the error or difference signal derived from the combination of a locally or remotely positioned course or reference control and a directional gyro, flux reference pick-off or the like, and shapes and emphasizes this difference signal to properly control an automatic pilot which has been suitably modified so as to be motor driven. Proper design of such a system in accordance with the principles of the present invention provides a combination control which will enable the craft to accomplish coordinated turns to any desired new course. The system as so designed will ordinarily require (in addition to conventional automatic pilot mechanism of the type incorporating means for initiating coordinated turns and having both roll and pitch vertically referenced) (a) a course intelligence control, (b) a directional reference, and (c) an azimuth turn control amplifier.

The course intelligence control may be of any type which is capable of providing a voltage, current, or phase characteristic in response to an operation significant of an angular change in course of a desired magnitude. As indicated above, this may be either a manually operated control or one which is responsive (as by radio link) to a remote signal having such significance. The directional reference may be any device capable of furnishing signals suitable for balancing against the course control output, and which signals are indicative of the azimuth orientation of the craft with respect to a fixed direction which may be known or unknown, depending upon whether the system is designed for the execution of course changes of a specified angular magnitude, or for the execution of course changes to a specified ultimate heading with reference to a fixed direction. Such directional reference signals may be derived from the amplified and controlled output of a known type of flux system, from a transducer driven by a servo system receiving intelligence from a flux reference or from a pick-off on a directional gyro with or without magnetic slaving.

A preferred manner of accomplishment of the above objects will be detailed hereinafter in connection with a specific exemplary embodiment thereof, which is illustrated in the accompanying drawings, but it is to be understood that the invention is in no way limited to such details, since the principles of the invention may be carried out in other ways, some of which will be referred to more specifically as the description proceeds.

Figure 2:
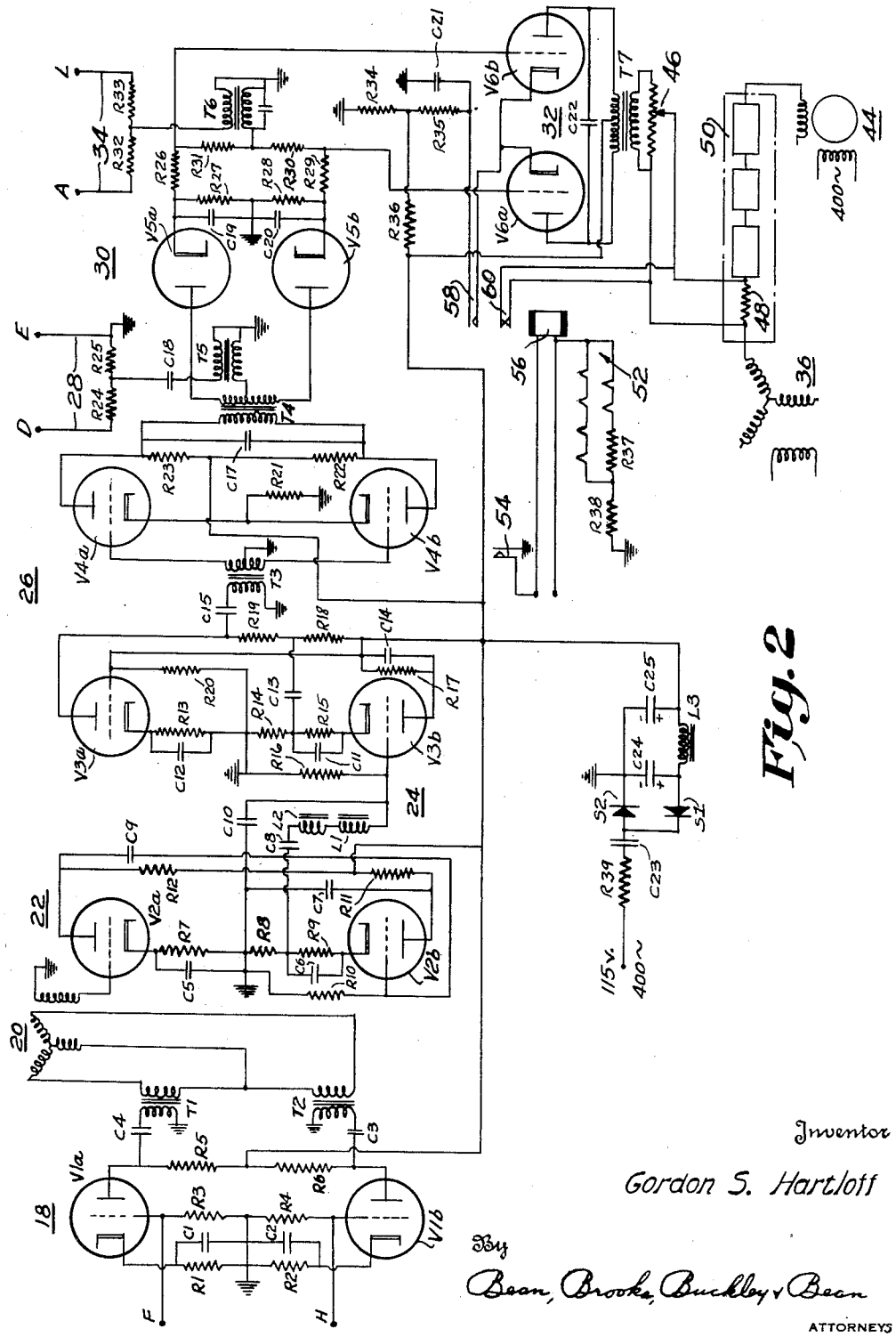
Figure 3:
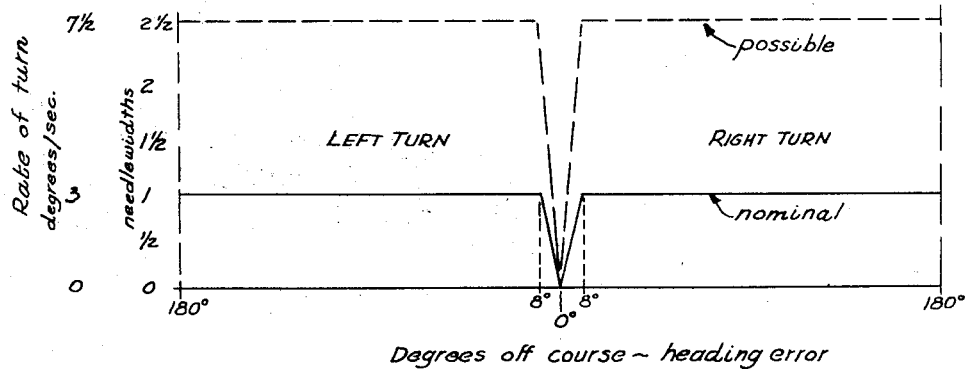
Figure 4:
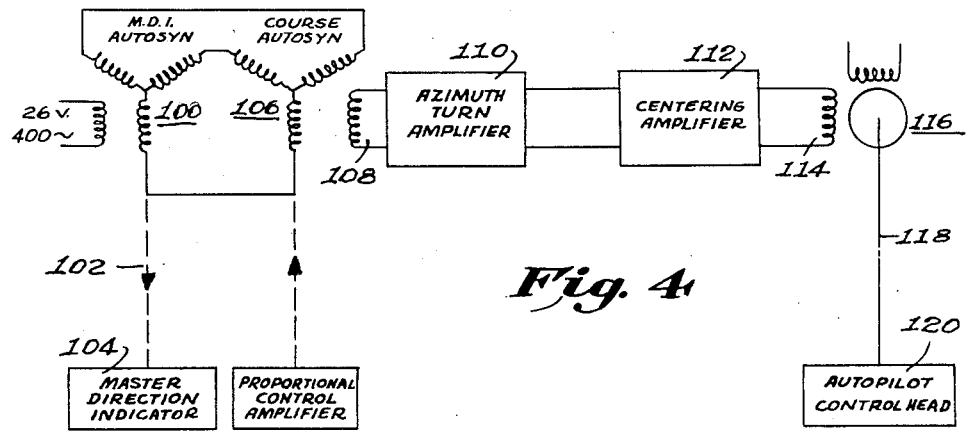
Figure 7:
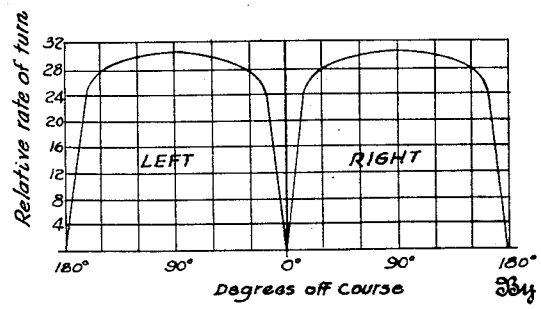
Figure 5:
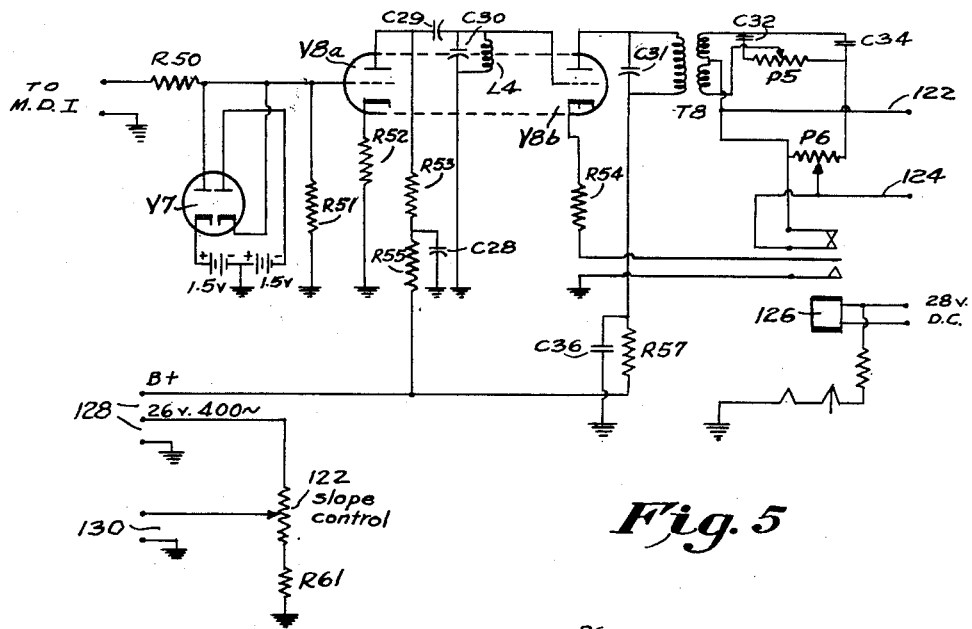
Figure 6:
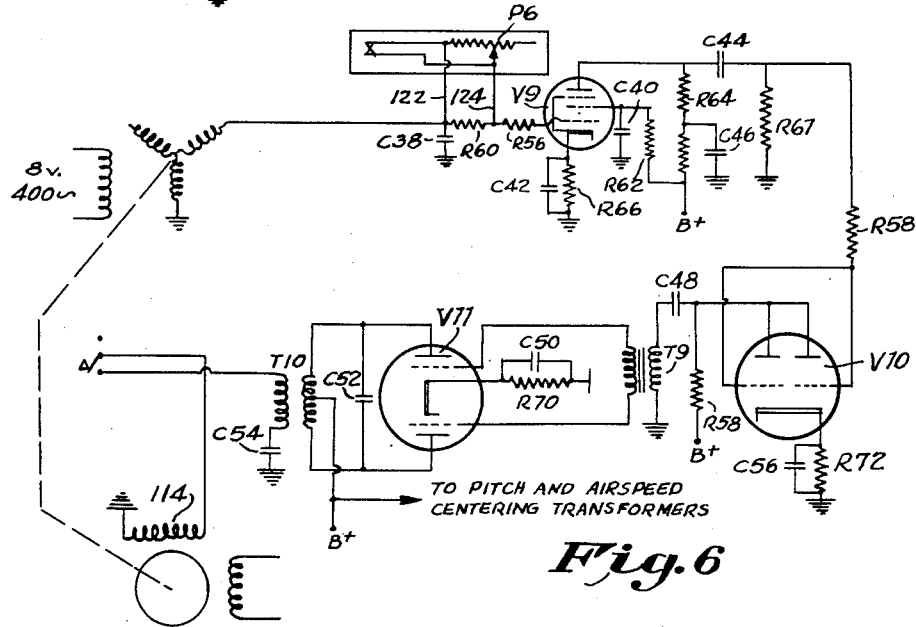

In the accompanying drawings, which form a part of the present disclosure,

Fig. 1 is a block diagram showing the general operation of the improved system,

Fig. 2 is a schematic diagram showing the electrical arrangement of the components illustrated in Fig. 1, Fig. 3 is a graphical representation of the performance characteristics of the azimuth turn amplifier, Fig. 4 is a block diagram of a simplified version of the invention, Fig. 5 is a schematic diagram of the azimuth turn amplifier of this embodiment, Fig. 6 is a schematic diagram of the centering amplifier of this embodiment, and Fig. 7 is a graphical representation of the operating characteristics of the azimuth turn amplifier of the same embodiment.

Referring now to Fig. 1 of the drawings, there is illustrated in block schematic form a complete system embodying the invention and illustrating the manner in which the novel elements thereof cooperate with existing directional reference equipment and automatic pilot control equipment. As shown in this figure, a directional reference system chosen by way of example comprises the four elements along the top of the figure, including a known form of direction-sensitive signal source 10 here represented as a flux gate, flux valve or the like, which produces a signal indicative of the azimuthal orientation of the craft against a fixed direction (which may be either known or unknown). In ordinary installations of this type, the output of this signal source 10 is coupled through an autosyn 12 to a suitable amplifier 14 and thence to a visual indicator 16 designated the Master Direction Indicator. In a typical known installation of this type, the signal output from flux gate 10 consists of a 975 cycle signal whose voltage amplitude is a measure of the deviation of the craft's heading from the reference direction, but it is to be understood that this signal may be of any character which is capable of signifying the amplitude and direction of such deviation.

The manner in which signals as described above are utilized by the azimuth turn amplifier of the present invention will now be described in connection with the schematic blocks in the central portion of Fig. 1. A portion of the signal output from the flux gate 10 is utilized to establish a reference direction for the azimuth turn amplifier, and to avoid undesired reactions upon the flux gate system, these signals enter the amplifier itself via an isolation amplifier stage designated 18, whose output is then compared with an azimuth turn signal either derived from a proportional control system operable remotely by a radio link, or from a locally controlled or adjusted signal source representative of a desired change in heading of the craft. In general, this comparison is effected by the section denoted "Co-ordinated Turn Autosyn" in Fig. 1 and designated by numeral 20. If the craft is not upon the heading called for by the azimuth turn intelligence control, there will be an error or difference signal derived from this autosyn 20, and in the embodiment being described this signal will comprise a voltage whose magnitude is a measure of the difference between the heading of the craft and that called for by the azimuth turn control.

The error or difference signal derived as above is fed into an amplifier 22 for the purpose of raising its level to a value where it can be effectively filtered and utilized in the control system. Numeral 24 designates a selective filter tuned to the 975 cycle frequency, and serving to eliminate any noise frequencies or other disturbing influences which may exist with the error voltage. After voltage amplification in amplifier 26 (which comprises a plurality of stages of amplification), this error signal constitutes an accurate source of information as to the degree of deviation of the heading from that called for by the coordinated turn autosyn and the source of azimuth control intelligence. However, since the deviation from the desired heading may lie on either side thereof, it is also necessary to provide some means for determining the "sense" or phase of such deviation, and this may be done (as illustrated in Fig. 1) by injecting a 975 cycle, fixed phase reference voltage which is conveniently derived from the single channel amplifier of the master direction indicator system over leads indicated by numeral 28. The mixed 975 cycle reference voltage and 975 cycle error voltage are then applied to the error amplifier and phase detector stage numbered 30, where they are converted to a direct current output voltage whose magnitude is proportional to the magnitude of the error voltage and whose polarity is determined by the phase relationship of such error voltage and the 975 cycle reference voltage.

In order to convert this signal-conveying direct current voltage to a suitable 400 cycle signal adapted for use in the control of the amplifier which drives the automatic pilot functions, a balanced modulator 32 is provided with a 400 cycle power input (for example from the usual power supply of the craft under control) over a channel indicated by 34, and the D.-C. output from the amplifier and detector stage 30 is utilized to modulate this 400 cycle power signal to provide a 400 cycle error or difference voltage suitable for control of the automatic pilot.

The remaining elements in Fig. 1 comprise a centering amplifier which operates to control torque units coupled to the turn and bank axis and the pitch axis of a conventional displacement autopilot. For the purposes of the present invention, only the turn and bank control channel is of interest, and the elements thereof are illustrated in Fig. 1 commencing with a centering autosyn 36 which defines center or level flight and furnishes a control voltage to a centering amplifier shown as voltage amplifiers 38, 40 and a power amplifier 42, the latter having its output coupled to one phase of a two-phase torque unit 44 mechanically coupled to the turn and bank axis of a conventional displacement autopilot. The other phase of this torque unit is supplied with 400 cycle voltage from the main power source. The 400 cycle error voltage from modulator 32 is introduced into the centering amplifier where it adds algebraically to the signal from the autosyn 36 defining center or level flight, thereby displacing the turn and bank torque unit 44 and initiating a coordinated turn in the direction called for by the azimuth turn intelligence supplied to the autosyn 20. Means are provided (for example a potentiometer 46) for limiting the maximum rate of turn for all error voltages in excess of a predetermined value (for example corresponding to a directional error of 8° or larger).

Referring now to Fig. 2 of the drawings, there is illustrated in detail the arrangement of the electronic components of the azimuth turn amplifier which results in a device which can be connected directly between the existing directional reference signal source and the automatic pilot control head. These components are designated generally by the same reference numerals as applied in Fig. 1.

The isolation amplifier 18 comprises a pair of space discharge devices V1a and V1b here shown as triodes (which may be within a single evacuated envelope and may constitute a single tube known as an RMA type 6SL7) and having their respective control electrodes or grids supplied with signal from the directional reference source (10 of Fig. 1) over shielded leads F and H. The third phase lead G from the directional reference may be connected to a common lead or ground serving as the common ground for the cathodes of subsequent stages. The grids of V1a and V1b are balanced to ground potential by high resistors R1 and R2, and each is suitably biased by the grounding of the respective cathodes through biasing resistors R3 and R4 bypassed by capacitors C1 and C2. The signal output from the plate circuits of V1a and V2a is applied through coupling capacitors C3 and C4 to the primary windings of a pair of audio-frequency transformers T1 and T2 whose secondaries are arranged in series with a common center connection to provide exciting voltage for the autosyn 20 whose output (modified by the azimuth turn intelligence to be introduced for example as an adjustment of the autosyn rotor either locally or by radio or other remote signal) is applied to the grid of an amplifier V2a which also may constitute one triode unit of a dual-triode type 6SL7 tube. Triode V2a is provided with grid bias resistor R7 and bypass capacitor C5, and serves to amplify the 975 cycle input signal to a desirable level for application to the selective filter 24.

The signal output from V2a is applied through coupling capacitor C9 to the grid of the second triode unit V2b, whose anode is coupled to ground through a capacitor C7. This triode unit V2b operates as a cathode follower by reason of the fact that its output is derived across a resistor R8 in the cathode circuit in series with bias resistor R9, the latter being bypassed by a suitable capacitor C6. The resistor R8 is of a very low order, and in combination with coupling capacitors C8 and C10 provides a suitably low impedance looking into the selective 975 cycle filter formed by the capacitors C8, C10 and inductors L1 and L2. The filtered output is applied to the control grid of one triode unit V3b of a third vacuum tube of the 6SL7 type. The anode-cathode output current of this unit is fed through coupling capacitor C14 to the gride of the other triode unit V3a of this same tube. Both sections of this tube are, of course, provided with the usual grid biasing resistors and bypass capacitors in their respective cathode circuits, and together these units and their associated components form two stages of the three stage amplifier designated by numeral 26 of Fig. 1. It will be observed that a portion of the plate circuit voltage applied to these triode units is applied to their respective input or control grid circuits through a coupling capacitor C13, resistor R14 and resistors R16 and R20, the values of these components being so chosen as to provide a feedback voltage which is out of phase with the respective signal inputs to the two stages. This inverse feedback stabilizes the cascaded voltage amplifier stations V3b and V3a and affords a degree of reduction of distortion of the signal.

The amplified 975 cycle output signal from triode section V3a is coupled through capacitor C15 to the primary winding of a push-pull input transformer T3 having its secondary winding grounded at its center and driving the respective control electrodes of the triode sections V4a and V4b (which may also conveniently be twin triode units in a single envelope tube such as a type 12SN7). The plate circuit output signal from this push-pull stage (which signal corresponds to the magnitude of the difference between the directional reference signal and the azimuth-turn signal injected at autosyn 20) is applied to a transformer T4 whose secondary winding has its ends connected to the respective anodes or plates of a pair of diode rectifier units V5a and V5b which may constitute a single vacuum tube of the 6H6 type.

In order to effect a determination of the sense of the error or difference existing between the directional reference information and the azimuth-turn signal imparted to the autosyn 20, and thereby to convey information as to whether the autopilot is to initiate a right or a left turn in order to eliminate or nullify this difference, a 975 cycle voltage which is of fixed phase with respect to the phase of the directional reference voltage is derived from the master direction indicator single channel amplifier (element 14 of Fig. 1) and is conveyed by a circuit extending from terminals D and E to the primary of a transformer T5 whose secondary is connected between ground and a center-tap on the secondary winding of transformer T4.

The elements V5a and V5b, and their associated circuit elements, constitute a full wave diode rectifier and phase detecting circuit providing a direct current output proportional to the magnitude of the error or difference voltage applied thereto, and having a polarity determined by the direction or sense of the phase difference between the error voltage and the fixed phase reference voltage applied to the transformer T5.

The amplified error voltage is supplied by transformer T4 to the anodes of the diode units V5a and V5b, and the fixed phase reference voltage from terminals D and E is injected at the center tap of the secondary of transformer T4, by transformer T5. It can be shown that the direct current voltage developed across the diode load resistors R27 and R28 (and hence across resistors R30 and R31) has the desired relationship with respect to the amplitude and phase of the amplified error voltage and the injected fixed phase voltage. For a detailed explanation of the operation of such a phase detector, reference may be made to the description appearing on pages 111 and 112 of the volume entitled "Theory of Servomechanisms," published in 1947 by the McGraw-Hill Book Company.

In order to convert this phase-detected direct current output signal to a form suitable for use in controlling the torque unit of the displacement autopilot, the balanced modulator stage 32 is provided, comprising triode units V6a and V6b (which may constitute a type 6SL7 tube), the 400 cycle frequency being applied by circuit 34 from terminals A and L across voltage dividers R32, R33 and thence to a modulation transformer T6 in a conventional manner. Output transformer T7 couples the plates of triode units V6a and V6b in a well known manner to produce across potentiometer 46 a 400 cycle voltage whose magnitude is proportional to the error voltage and whose phase represents the difference in phase between the error voltage and the fixed-phase reference voltage. This output voltage is applied across resistor 48 connected between the centering autosyn 36 and the first stage 38 of the bank and turn channel of centering amplifier 50 (which as shown in Fig. 1 also includes a subsequent voltage amplifier stage 40 and power amplifier 42). The output signal of the turn and bank channel of centering amplifier 50 is of course connected to one phase winding of the two-phase bank and turn torque unit 44 mechanically linked to the displacement autopilot 44, the other phase winding of such torque unit being supplied directly from the principal 400 cycle power source of the aircraft. The sliding contact of potentiometer 46 serves to adjust the maximum amplitude of the output signal in order to limit maximum rate of turn which can be transmitted to the autopilot; for example, the predetermined maximum rate of turn may be established for azimuthal errors of whatever magnitude in excess of 8°.

Plate voltage supply for all of the vacuum tubes in the above apparatus is conveniently furnished by a transformerless voltage-doubler circuit comprising resistor R39, capacitors C23, C24 and C25 and inductor L3 arranged in a doubling circuit employing two miniature selenium rectifiers S1 and S2. The operation of such a voltage doubler circuit is well known to those skilled in this art, and therefore, need not be more fully detailed herein. Power for operation of the heaters for the cathodes shown at 52 is supplied from any available source through a manual on-off switch 54, and operation of this switch to "off" or open-circuit condition also deenergizes a relay 56 whose contacts 58 open to disconnect the ground return circuit from the cathodes of modulator triodes V6a and V6b. At the same time, relay contacts 60 will close to short-circuit the output circuit from potentiometer 46 (which will also short circuit resistor 48 in the centering amplifier 50) to restore the normal condition of the centering amplifier for manual control.

The over-all characteristics of the above system provide for a controlled response of the autopilot torque unit to the azimuth turn control intelligence supplied to autosyn 20, which response is indicated graphically in Fig. 3 of the drawings. In this figure the rate of turn expressed in degrees per second (and also in needlewidths) is plotted as a function of the magnitude of the difference in heading of the craft from that called for by the azimuth control intelligence signal, the full line curve marked "nominal" demonstrating that the rate of turn established for any difference in heading from that called for is proportional to such difference for values thereof not exceeding 8 degrees. For differences in heading in excess of 8 degrees, whether right or left, the rate of turn will be a constant depending upon the setting of the potentiometer 46 (Figs. 1 and 2). Thus, the full line or "nominal" characteristic of Fig. 3 corresponds to a maximum rate of turn of one needlewidth or 3 degrees per second. The dash line characteristic of Fig. 3 (bearing the legend "possible") corresponds to that setting of potentiometer 46 corresponding to the maximum desired rate of turn, shown for example as 2½ needlewidths (7½ degrees per second).

Circuit constants used in a satisfactory exemplary embodiment of the Fig. 2 amplifier are as follows:

Capacitors:                                         Mfd.
  C1, C2, C5, C6, C11, C12, C21 _____ 10.
  C3, C4, C7, C9, C15 _____  .05
  C8, C10 _____  .30
  C13, C16 _____  .01
  C14 _____   .001
  C17 _____   .002
  C18 _____   .0015
  C19, C20 _____  .1
  C22 _____   .2
  C23, C24, C25 _____ 20.

Resistors:
  R1, R2, R12 _____ohms__ 500,000
  R17, R19 _____do____ 500,000
  R3, R4, R7, R13 _____do____   8,000
  R5, R6, R30, R31 _____do____  50,000
  R8 _____do____      51
  R9 _____do____     500
  R10, R16 _____megohm__     1
  R11, R24, R25 _____ohms__ 25,000
  R14, R15 _____do____  4,000
  R18 _____do____  10,000
  R20 _____do____     680
  R21 _____do____  47,000
  R22, R23, R26, R27, R28, R29 ____do____ 100,000
  R32 _____do____   4,700
  R33 _____do____   6,700
  R34, R35 _____do____   2,000
  R36 _____do____  80,000
  R37, R39 _____do____      20
  R38 _____do____       5
  46 _____do____     500

Inductors:
  L1, L2 _____henry__ 0.1

The above system utilizes an azimuth control amplifier deriving its course reference from a standard master direction indicating system through an isolation amplifier which eliminates any possibility of an unfavorable reaction upon the direction indicator itself, in that the azimuth turn control amplifier throws substantially no additional load upon the output of the flux gate of such direction indicator. Also, since the course reference signal is derived directly from the flux gate of the master direction indicator, and not from some subsequent point in the direction indicator channel, the resulting over-all azimuth turn control system is free from oscillation and other effects due to inherent time delays of available master direction indicators. For some purposes, however, and particularly in the interest of simplicity and economy, it would be desirable to derive the course reference information from an auxiliary autosyn similar to the coupling autosyn 12 indicated in Fig. 1, such auxiliary autosyn being already available in certain forms of master direction indicator systems.

There will now be a described a simplified version of the azimuth turn control, deriving its course reference information from such an auxiliary autosyn, and whose novel features provide a system which minimizes the deleterious effects of the extra time lag introduced, and provides a control system which is stable and in which the amount of "overshoot," when present, is entirely unobjectionable. This modification of the invention is illustrated in block form in Fig. 4 of the drawings, while Figs. 5 and 6 are schematic diagrams of the circuitry employed in the azimuth turn amplifier and centering amplifier of such modification.

Referring now specifically to Fig. 4 of the drawings, there is illustrated the coupling autosyn 100 of a known form of master direction indicator which operates over a channel 102 to control the master direction indicator itself, designated by numeral 104. The antosyn 100 is mechanically coupled back-to-back with an auxiliary autosyn 106 whose output (from winding 108) drives azimuth control amplifier 110 which operates to modify the output of centering amplifier 112 in much the same way as that described in more detail above in connection with the system of Figs. 1 and 2. This centering amplifier 112 in turn controls one phase winding 114 of the torque unit 116 mechanically linked as at 118 to the autopilot control head 120. Since the general functioning of parts is analogous to that described above in connection with the prior embodiment, the description of the present embodiment will be restricted to those portions of the complete system which differ substantially from corresponding portions heretofore described.

Referring now to Fig. 5 of the drawings, a slope control potentiometer 122 is provided to regulate the output of the master direction indicator and course autosyns 100 and 106, thereby controlling the gain and slope of the response characteristic. The output signal from this autosyn (obtained from winding 108 of Fig. 4) is fed through a resistor R-50 to an amplitude-limiting circuit comprising a pair of diodes which may be enclosed in a single envelope V7 constituting a duplex-diode vacuum tube of the 12H6 type, and operable to limit the magnitude of the input signal to a triode amplifier V8a whose output circuit contains a high "Q" coil L4 and associated capacitance C30 constituting a 400 cycle resonant filter. The purpose of this filter is to resonate tube V8a to 400 cycles and thereby to attenuate harmonics of the input signal which are produced by the clipping action of diode limiter V7. A second triode unit V8b (which may be in a common envelope with V8a constituting a type 12AU7 tube) operates to isolate the error voltage from ground potential. A phasing control comprising capacitors C32, C34, and potentiometers P5 adjusts the phase of the output of the tube V8b prior to its appliaction (through transformer T8) to the centering amplifier to be described. The output signal from this azimuth turn amplifier is available at leads 122, 124, and as in the previous embodiment a potentiometer P6 provides control over the maximum rate of turn of the aircraft for saturation error in course or heading. Relay 126 performs the same function as the corresponding relay 56 of the prior embodiment. It will be observed that the cathode resistors R52 and R54 of the tubes V8a and V8b are left unbypassed to provide degeneration or inverse feedback and hence to stabilize the output against distortion and changes in gain with tube aging, according to well known principles of electronic design. Power supply for the anodes of V8a and V8b is conveniently obtained over leads 128 from the centering amplifier to be described below.

Basically, the centering amplifier shown in Fig. 6 is again one which supplies the power to drive a torque unit whose output is mechanically coupled to the turn and bank section of an autopilot control and is also coupled to a reference autosyn, the latter supplying the exciting voltage to the centering amplifier. As a result, the centering amplifier always drives the torque unit so as to seek a null position of the autosyn. When the azimuth turn function is introduced, the centering amplifier becomes the follow-up for the azimuth turn system. The azimuth turn voltage is inserted in series with the reference autosyn (for example from terminal 130 through slope control 122) and thus displaces the centering and calls for a coordinated turn so long as the azimuth turn voltage exists.

The arrangement of parts of a suitable centering amplifier for the above purpose may comprise, as shown in Fig. 6, an amplifier tube V9 (for example a miniature pentode type 9003) giving a voltage gain of approximately 100, and whose output drives parallel-connected twin triode V10 of the 6J6 type, for power amplification. A transformer T-9 couples tube V10 to the push-pull grids of a twin triode V11 (also a 6J6 type) operating as a class C amplifier whose output is coupled through output transformer T10 to one phase 114 of the torque unit 116, whose other phase is again supplied from the 400 cycle line. The operation of this centering amplifier requires no particular comment except that it will be noticed that resistors R56 and R58 are provided in the grid circuits of their respective vacuum tubes to prevent blocking of the amplifier by input signals of excessive magnitude.

It has been found that the simplification permitted by the disclosed construction of the embodiment just described is accompanied by only an unobjectionable deviation in the performance from optimum response. As indicated in the graph of Fig. 7, the deviation from a substantially constant rate of turn where the heading error is in excess of a certain saturation value, is not excessive. In most installations such deviations from optimum will in no way interfere with the efficient accomplishment of coordinated turns.

Circuit constants employed in satisfactory embodiments of the arrangements of Figs. 5 and 6 are as follows:

Capacitors: Mfd.
C28, C29, C32, C34, C36, C40, C44, C46, C48 _____ 0.1
C30 _____ 0.7
C31 _____ 0.05
C38 _____ 2
C42 _____ 10
C50, C56 _____ 25
C52 _____ .01
C54 _____ .5

Resistors:
R50 _____ ohms__ 200,000
R51 _____ megohms__ 15
R52 _____ ohms__ 1,000
R53 _____ do____ 50,000
R54 _____ do____ 700
R55, R57 _____ do____ 5,000
R56 _____ do____ 160,000
R58 _____ do____ 100,000
R60 _____ do____ 10,000
R62 _____ megohms__ 2
R64 _____ ohms__ 430,000
R66, R72, R61 _____ do____ 2,000
R67 _____ do____ 500,000
R68 _____ do____ 56,000
R70 _____ do____ 100
P5 _____ do____ 100,000
P6 _____ do____ 200,000
122 _____ do____ 500

Many modifications of the coordinated turn control system herein disclosed may be made. For example, in place of utilizing information from a master direction indicator as the course reference, an autosyn type pickoff driven by a directional gyro without slaving may be used which will permit automatic angular course changes of known value (but without known direction except where the gyro has been preset to a magnet heading). In such a modification, gyro drift error will be present, but such an arrangement might be quite suitable for short duration flights of missiles and aircraft where space for flux reference systems is not available. While the invention has been disclosed in connection with autosyn type directional references, obviously potentiometer type pickoffs may equally well be used for course changes of limited magnitudes, and such pickoffs are within their limitations quite satisfactory, simpler and usually more economical where limited angular rotation or yaw is adequate.

The embodiments of the invention illustrated in the drawings and described above have all involved the application of azimuth turn control intelligence to the existing control heads of autopilot systems, through torque units capable of converting such intelligence into mechanical movement of the autopilot control element. It is apparent, however, that such signals might equally well be applied to the networks or amplifiers of autopilot systems directly (that is, without being repeated through the torque unit and autopilot control head), for producing the desired stabilized control to accomplish course changes. In some applications, this system would render unnecessary any manual control head for the autopilot system, and the term "automatic pilot" as used in the appended claims is therefore not intended to be construed as necessarily including the mechanically driven control head, so long as the essential surface-controlling functions are provided.

The invention has been described herein in terms of particular arrangements of apparatus which have been found upon test to perform satisfactorily, but these preferred arrangements are to be taken as exemplary, it being understood that modifications and variations thereof may be made without departing from the spirit of the invention as defined in the appended claim.

What is claimed is:

An automatic azimuth turn control for aircraft of the type provided with a directional reference system, an automatic pilot and servomotor mechanism for initiating coordinated turns of said aircraft, comprising means for deriving from said directional reference system an alternating voltage corresponding to the heading of such aircraft, a vacuum tube amplifier resonant to the frequency of said alternating voltage for comparing said voltage with an intelligence signal characteristic of a desired heading of such aircraft, means controlled jointly by said means and said amplifier for applying to said servomotor mechanism signal energy adapted to cause said mechanism to alter the heading of said aircraft in such a manner as to eliminate the difference in the heading of said aircraft and the heading called for by said signal, said amplifier providing an output signal which is proportional to the difference in heading for values of the latter not exceeding a predetermined maximum, and means for limiting said output signal to a predetermined level for differences in heading exceeding said predetermined maximum.

References Cited in the file of this patent

UNITED STATES PATENTS

| Number | Name | Date |
|---|---|---|
| 1,586,233 | Anschutz-Kaempfe | May 25, 1926 |
| 2,376,513 | Shaffer | May 22, 1945 |
| 2,423,337 | Moseley | July 1, 1947 |
| 2,424,569 | Moseley et al. | July 29, 1947 |
| 2,450,907 | Newton et al. | Oct. 12, 1948 |
| 2,471,637 | MacCallum | May 31, 1949 |
| 2,479,563 | Ferrill | Aug. 23, 1949 |
| 2,496,809 | Moseley | Feb. 7, 1950 |
| 2,539,411 | Esval et al. | Jan. 30, 1951 |
| 2,570,905 | Young | Oct. 9, 1951 |
| 2,586,034 | Halpert | Feb. 19, 1952 |
| 2,602,611 | Glenny | July 8, 1952 |
| 2,613,352 | Kellogg | Oct. 7, 1952 |
| 2,662,207 | Hollister | Dec. 8, 1953 |